3,334,084
MONO AZO PYRAZOLONE DYESTUFF
Gordon A. Geselbracht and Frederick E. Barwick III,
Charlotte, N.C., assignors to Martin-Marietta Corporation, a corporation of Maryland
No Drawing. Filed Sept. 11, 1964, Ser. No. 395,946
1 Claim. (Cl. 260—163)

The present invention relates to a dyestuff, and more particularly to an azo dyestuff and to the method for making same.

The dyestuff of the present invention is particularly characterized in having the formula

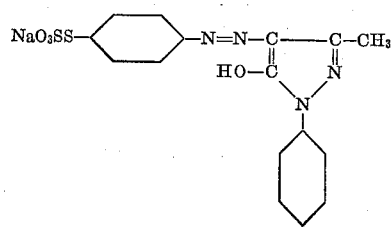

The dyestuff of the above formula may be prepared by a process comprising the step of coupling equimolar amounts of diazotized sodium S-4-aminophenylthiosulfate and 1-phenyl-3-methyl-5-pyrazolone.

The dyestuff of the present invention is water soluble, and may be applied to cotton fabric by the thermofixation method, described in detail hereinafter, to produce bright yellow dyeings and prints having excellent fastness to washing, light, resin, dry cleaning, and excellent wet and dry crocking fastness.

It is know from the prior art to produce an azo-disulfide dye by coupling two moles of phenylmethylpyrazolone with one mole of tetrazotized 4:4'-diaminodiphenyl-disulfide. This dye has the disadvantage of not being water soluble, and the further disadvantage that it cannot be applied to cotton fabric by the thermofixation method. This prior art dye, when applied to cotton by the reduction-oxidation method, gives dyeings which are much duller and somewhat more reddish-yellow than dyeings produced from the dye of the present invention by thermofixation. Moreover, this prior art dye cannot be removed (stripped) from dyed fabric cleanly with sodium sulfide.

It is known from the prior art to produce an azo dyestuff having a pendant thiocyanate group by coupling equimolar amounts of 1-phenyl-3-methyl-5-pyrazolone and diazotized 1-amino-4-thiocyanobenzene, for application to polyesters, polyamides, and acetate rayon by the long bath disperse dyeing method. The disadvantages of this dye are that it is not water soluble, and also that it cannot be applied to cotton by the thermofixation method. Also, the possibility of hazardous results exists, through accidental liberation of hydrogen cyanide.

There are also known azo dyes having bridging members, such as alkylene, —$SO_2$—NH-alkylene, etc., intervening between the thiosulfate groups and the remainder of the dye molecule. Other than in exceptional cases, these dyes must contain more than one thiosulfate group. Moreover, these dyestuff molecules are usually large, e.g. of high molecular weight. Accordingly, these dyes have disadvantages, for example (1) they are prepared from S-alkyl-3-aminophenythiosulfates, which are more expensive than sodium S-4-aminophenylthiosulfate; (2) providing more than one thiosulfate group per dye molecule entails additional expense and steps in the procedure; and (3) the large size of these dye molecules causes them not to penetrate textile fibers as well as the dye of the present invention, thereby causing crocking (marking off) in some instances. These dyes have the additional disadvantage that they cannot be stripped from fabric with sodium sulfide.

It has also been suggested in general terms that dyestuff may be prepared by coupling diazotized aromatic amines containing thiosulfuric acid groups with any desired coupling components. Such general statements are of little value, as they suggest no specific combination of amine and coupling component, and also because the vast majority of dyestuffs falling within this general terminology are useless for commercial purposes because of lack of one essential property or another, such as light fastness and wash fastness. However, it has also been stated that dyes with only one thiosulfate group per molecule are practicable only in exceptional cases, and that the dyes should preferentially contain several thiosulfate groups. Moreover, the art has been taught away from thiosulfate dyes without aliphatic bridges between the thiosulfate group and the remainder of the dye molecule.

Accordingly, it is surprising and unexpected that the dyestuff of the present invention, which contains only one thiosulfate group and which has no aliphatic bridging member between the thiosulfate and the adjoining benzene radical, is a practicable dyestuff with excellent fastness properties.

The dyestuff and method of the present invention have overcome the above disadvantages and limitations of the prior art and provided additional advantages as follows.

The dyestuff of the present invention provides bright yellow dyeings and prints and has high tinctorial value.

The dyestuff of the present invention may be applied to cotton fabric by the thermofixation method, hereinafter described, as well as by conventional reduction-chemical oxidation methods, such as by applying from a reduced bath with aqueous sodium sulfide, squeezing, oxidizing in chrome and acid, scouring and drying. The thermofixation method is preferable as it is more economical, and also because color loss of the soluble leuco form of the dye cannot occur in a wet processing step.

The dyestuff of the present invention is water soluble, which provides ease and economy in application to textile fibers.

Contrary to most prior art thiosulfate dyes, the dyestuff molecule of the present invention is small, and thoroughly and quickly penetrates textile fibers, and thereby avoids crocking.

Contrary to nearly all thiosulfate dyes, the dyestuff of the present invention has only one thiosulfate group; thereby minimizing cost and method steps.

The dyestuff of the present invention has no aliphatic bridging member between the thiosulfate and the benzene radical. This also minimizes expense, as aminophenylthiosulfates having such bridging members are more expensive than those without bridging members. Also, the dye of the present invention is made from a S-4-aminophenylthiosulfate, which is less expensive than the S-alkyl-3-aminophenylthiosulfates used in the prior art methods.

The dyestuff of the present invention may be stripped cleanly from fabric with sodium sulfide, unlike thiosulfate dyes with aliphatic bridging members between the thiosulfate and the benzene radical and also unlike the dyestuff resulting from coupling a mole of tetrazotized 4:4'-diaminodiphenyldisulfide with two moles of phenylmethylpyrazolone. This is a valuable property, as dyers frequently wish to remove dyestuffs from dyed fabric and often encounter great difficulty in so doing.

Finally, the dyestuff of the present invention, after fixation to cotton fabric, discharges cleanly with alkaline reducing agents, such as sodium sulfoxalate and soda ash, and accordingly is very suitable for discharge printing, for example by first dyeing pre-bleached white cotton fabric with the present dye and then printing on the discharge agent to remove the color from selected areas of the fabric and give a clean white and yellow fabric. Also, dyeings made from the present dyestuffs may be overprinted with vat or sulfur dyestuff combined with a discharge agent, to produce multicolored fabrics.

An illustrative example follows.

Example 1

The dyestuff of the formula

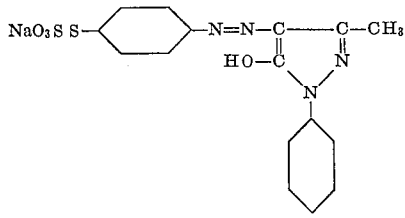

may be prepared as follows.

One g. M.W. of sodium S-4-aminophenylthiosulfate is diazotized by dissolving 227 gms. thereof in 1.6 liters hot water, icing to 0° C., adding enough 32% aqueous HCl to adjust the pH to acid on Congo paper (approximately 100 ml.), then adding 10 ml. more 32% aqueous HCl to cause precipitation. Add 230 ml. 32% aqueous HCl and enough ice to cool to −5° C. (approximately 200 gms.). Add thereto 250 ml. 4 N aqueous sodium nitrite at −5°. Ice to 0–4° and stir 30 minutes. Enough sulfamic acid is added to render the solution negative to starch-KI paper, thereby removing excess nitrous acid. The resulting diazo solution is maintained at 0° C.

A slight excess more than 1 g. M.W. 1-phenyl-3-methyl-5-pyrazolone (179 gms.) is dissolved in 1.5 liters warm water and 1,350 gms. 20% aqueous sodium carbonate by stirring 30 minutes. Ice the resulting pyrazolone solution to 12° C.

Coupling is effected by adding the diazo solution at 0° C., gradually with stirring during 5–6 minutes, to the pyrazolone solution at 12° C. Stirring is continued, while the temperature is permitted to rise to room temperature, until coupling is completed. Approximately 12 hours will be required for coupling to be completed (completion of reaction is indicated by absence of a violet coloration when a sample is spotted on filter paper, streaked with aqueous resorcinol, and an aqueous solution of soda ash added thereto).

The dyestuff is recovered by filtration and dried at 75°–98° C.

The dyestuff of the present invention may be utilized to dye cotton fabric by padding onto the fabric, at 140° F., a dye solution consisting of 25 parts of the dye, 50 parts thiourea, 100 parts urea, 2 parts sodium alginate migration inhibitor, and 823 parts water; squeezing to 60% wet pick up based on fabric weight; pre-drying to 10% moisture content; and heating in a curing oven for one minute at 400° F. to fix the dye. The fabric is thereafter washed and dried.

The resulting yellow dyeing is fast to 20–30 hours "Fadometer" exposure (light fastness test), No. 3 A.A.T.C.C. wash test, dry cleaning, and to wet and dry crocking.

The above dyed fabric was resinated in conventional manner with polymethylol triazine resin without change of shade.

Printings may be made in similar manner by applying to cotton fabric a printing paste at room temperature consisting of 2.5 parts dye, 10 parts urea, 5 parts thiourea, 26.2 parts 10% aqueous starch-ether thickener, and 56.3 parts water; drying on heated cylinders; heating in a curing oven maintained at 410° F. for 90 seconds; rinsing in water at room temperature; washing with soap and drying. The printed fabric likewise has excellent fastness to light, washing, dry cleaning, resination, and wet and dry crocking.

Printings may also be made by the reduction-oxidation method.

The above parts are by weight.

What is claimed is:

The dyestuff of the formula

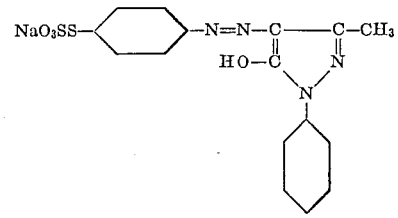

No references cited.

CHARLES B. PARKER, *Primary Examiner.*

D. M. PAPUGA, *Assistant Examiner.*